Patented Sept. 7, 1926.

1,599,369

UNITED STATES PATENT OFFICE.

SIDNEY W. MOSS, OF MORRISTOWN, NEW JERSEY, ASSIGNOR TO THE DE LAVAL SEPARATOR COMPANY, OF NEW YORK, N. Y., A CORPORATION OF NEW JERSEY.

PROCESS OF PRODUCING FROM CRUDE PETROLEUM PURIFIED ASPHALTIC RESIDUES.

No Drawing.   Application filed September 29, 1922.   Serial No. 591,212.

Asphalt, for many purposes, is required to be relatively pure, that is, to contain not more than about two per cent of insoluble matter. For certain purposes, a substantially higher degree of purity is required. For practically all purposes, reduction of the content of insoluble matter is a desideratum. Thus, in the paving of streets with asphalt, if insoluble matter is present to any great extent, the tendency is for the paving to separate from the street foundation.

A well known source of asphalt is crude petroleum, the asphalt being left as a residue after the first distillation. This asphalt being virtually a by-product in the mineral oil refining industry, it can be profitably sold at a price less than that commanded by natural asphalt, but it contains so high a proportion of insoluble material that it cannot satisfy all requirements and cannot command the price that it would command if the larger part of these insoluble products could be removed.

It has not been found possible to remove these impurities from the asphaltic residue in petroleum distillation, and it is very doubtful whether any process can ever be devised for a really economic purification of this residue.

I have discovered, however, that the crude petroleum prior to distillation may be treated in such manner that when distilled the residual asphalt will contain less than one-half of one per cent of insoluble matter and will meet the most exacting requirements of users of asphalt.

Having thus disclosed the object and result of my invention, I will proceed to set forth that mode of execution of my new process which I believe to be the best.

The petroleum, as received from the pipe line, is pumped into a still or other receptacle and heated to a temperature substantially above the highest natural atmospheric temperature, say about 200° F., at which temperature the petroleum flows comparatively freely. The heated petroleum is then continuously fed to a centrifugal separator, or battery of separators, and is continuously discharged therefrom in two streams, one comprising salt water, silt, scale from the pipe line and other impurities and the other the purified crude petroleum. It is not imperative to use any particular type of separator, but I have secured the best results by using a separator of the type set forth in the Snyder Patent No. 1,283,343, dated October 29, 1918.

The purified petroleum is then led to a second still, preferably without permitting the temperature thereof to fall very substantially below the temperature of the initial heating and the temperature is then raised to that required to distill off the desired products. It is preferred to avoid loss of heat in conducting the petroleum to and from the centrifuge by insulating the piping and the centrifuge.

The success of the process is due, in my opinion, to the fact that most of the substances which, in the ordinary distilling process, remain in and contaminate the asphalt, are of a specific gravity not only higher than the distillate but higher than the distillate and asphaltic material which, together, may be regarded as pure natural crude petroleum, and due also the fact that one of these heavier contaminating materials is salt water which, being free-flowing, and not in solution, is capable of centrifugal separation and acts, in the centrifugal operation, as a carrier for the other contaminating ingredients of the impure crude petroleum, and enables such ingredients to flow out with, or be sludged out by, the salt water through the heavier discharge outlet of the centrifuge. A further function of the preliminary purification of the crude petroleum is to prevent the formation of additional impurities, principally scale, in the distilling process itself.

Inasmuch as the heat advisable, if not absolutely required, for centrifugal separation, is conserved and utilized in the distilling operation, the only added expense of the process is that involved in the first cost of the centrifuges and in the power and labor required to operate them. This expense, however, is more than offset by the fact that the initial centrifugal purification of the crude petroleum prevents the deposition of salt, silt and other impurities in the stills used for separating the asphalt. Such deposition forms a scale, which acts much as a boiler scale to pit the plates and causes great loss in transfer of heat, with consequent bulging of the plates of the stills.

After distillation, therefore, in the ordinary process, it is necessary to allow the still to cool down and then remove the scale from the plates. The stills thus are subjected to rapid physical deterioration, and they can be operated scarcely more than forty per cent of the time. In the practice of my process, the life of the still is enormously increased and the still need be out of operation not more than about twenty per cent of the time.

The economic loss by the old process, which is avoided in my process, more than balances the interest on the capital cost of the centrifuges and the cost of operating them and maintaining them in a condition of maximum efficiency. It is therefore possible, by my process, to produce a purified asphaltic derivative of crude petroleum at a cost less than that required, by the present process, to produce an impure and less valuable derivative.

Having now fully described my invention, what I claim and desire to protect by Letters Patent is:

The method of producing, from crude petroleum that is contaminated with insoluble impurities, an asphaltic derivative having a minimum percentage of impurities, which comprises heating the petroleum to a distilling temperature in two stages and subjecting the petroleum between the first and second heating stages to the action of centrifugal force to eliminate therefrom the major part of its content of insoluble impurities, the temperature of the second stage being maintained until an asphaltic residue is left, whereby the deposition of salt and other impurities in the high temperature still is minimized and an asphaltic derivative produced which contains substantially less than two per cent of insoluble matter.

In testimony of which invention, I have hereunto set my hand, at Philadelphia, Penna., on this 28th day of September, 1922.

SIDNEY W. MOSS.